Figure 1:
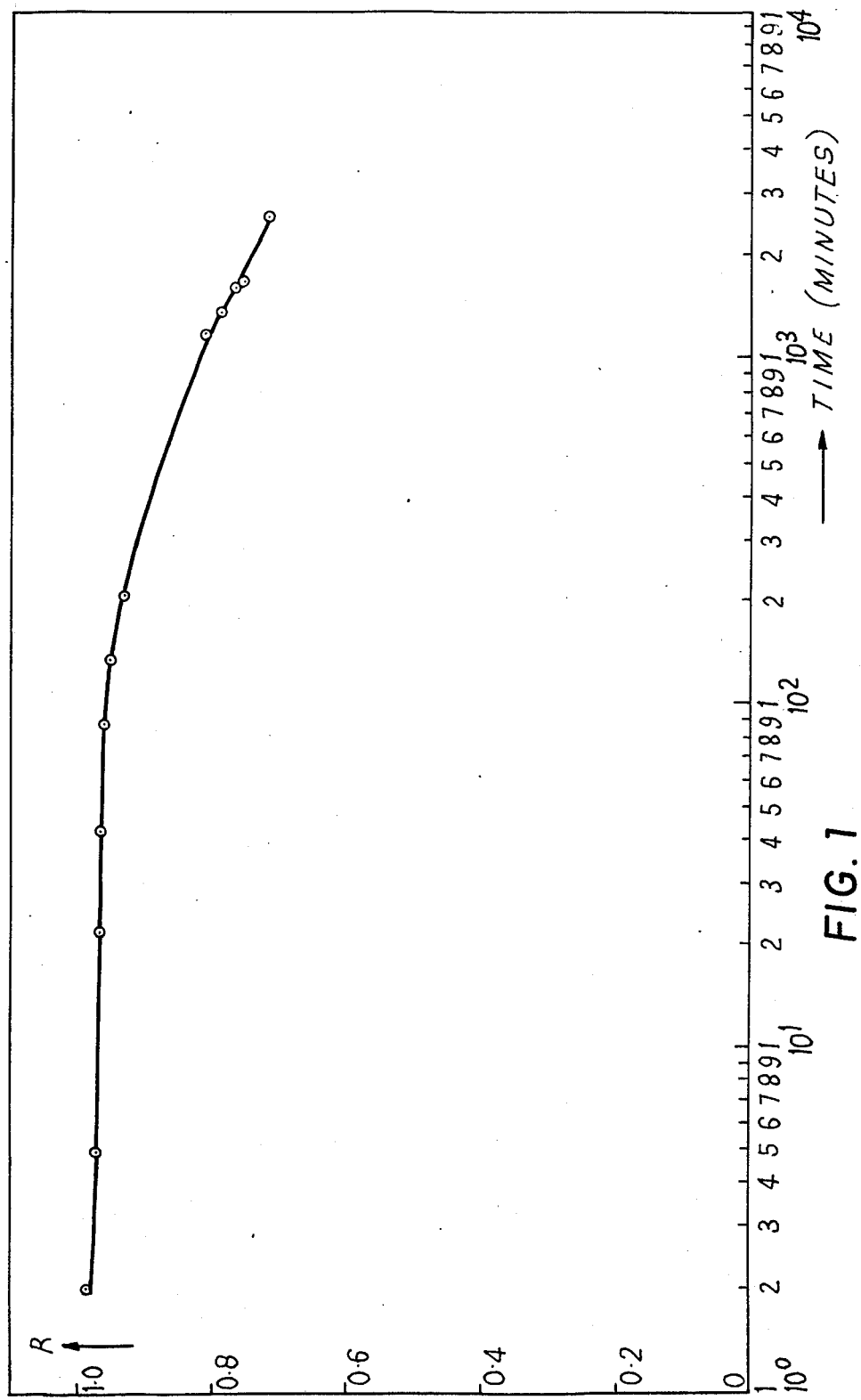

United States Patent [19]

Hand

[11] 3,955,418

[45] May 11, 1976

[54] TEMPERATURE INDICATORS

[75] Inventor: Roger Lindsay Hand, Bramhall, England

[73] Assignee: Imperial Chemical Industries Limited, London, England

[22] Filed: July 31, 1973

[21] Appl. No.: 384,392

[30] Foreign Application Priority Data
July 31, 1972 United Kingdom............... 35638/72

[52] U.S. Cl. ............................. 73/339 R; 73/363; 264/230
[51] Int. Cl.² ..................... G01K 3/04; G01K 5/56; G01K 5/62; G01K 11/08
[58] Field of Search ................. 73/15.6, 339 R, 363; 116/114.5; 264/230, DIG. 71

[56] References Cited
UNITED STATES PATENTS

| | | | |
|---|---|---|---|
| 2,647,393 | 8/1953 | Stewart | 73/15.6 |
| 3,291,617 | 12/1966 | Barker et al. | 116/114.5 |
| 3,369,391 | 2/1968 | Warfield | 73/15.6 X |
| 3,403,558 | 10/1968 | Elliot | 73/362 A X |
| 3,452,599 | 7/1969 | Kishel | 73/363 |
| 3,483,748 | 12/1969 | Rogen et al. | 73/334 R |
| 3,521,477 | 7/1970 | Dollet | 73/15.6 |
| 3,597,372 | 8/1971 | Cook | 264/230 X |
| 3,691,501 | 9/1972 | Katchka et al. | 73/363 X |

OTHER PUBLICATIONS

Stille, J. K. *Introduction to Polymer Chemistry*, pp. 30–33, Wiley, N.Y. copyright 1962.

*Primary Examiner*—James J. Gill
*Assistant Examiner*—Frederick Shoon
*Attorney, Agent, or Firm*—Cushman, Darby & Cushman

[57] ABSTRACT

A device capable of indicating the time/temperature history of a frozen product, comprises a strained article of elastomeric material having a glass/rubber transition temperature above the storage temperature of the frozen article and having the property of relaxing over a temperature range below the glass/rubber transition temperature at a rate which is dependent on the temperature, and an indicator for indicating the amount of relaxation of the article on change of temperature through the glass/rubber transition temperature.

7 Claims, 12 Drawing Figures

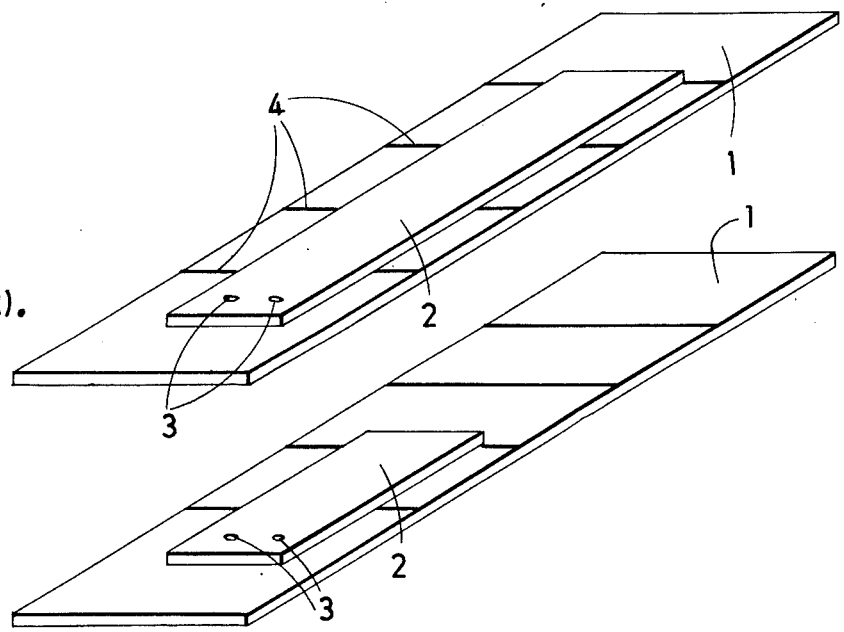
FIG.4(a).
FIG.4(b).
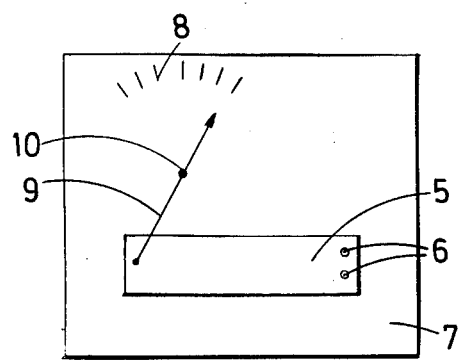
FIG.5.

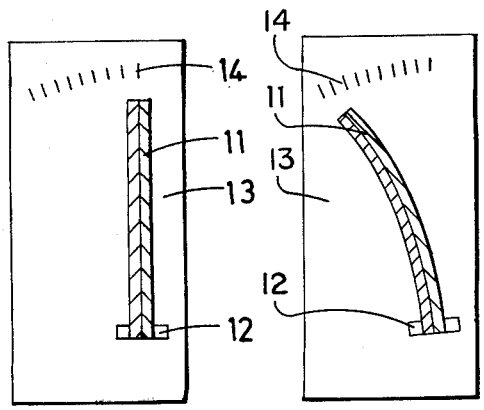
FIG.6(a).    FIG.6(b).
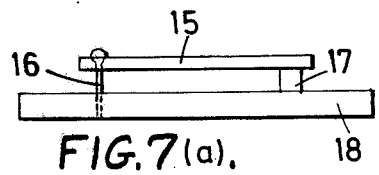
FIG.7(a).
FIG.7(b).
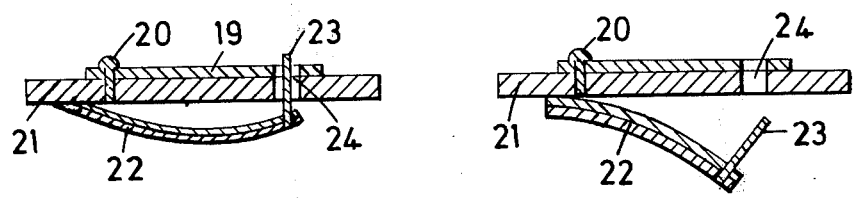
FIG.8(a).    FIG.8(b).

TEMPERATURE INDICATORS

This invention relates to temperature indicators for showing the thermal history of frozen food packages or other articles.

Frozen foods and certain pharmaceutical preparations have only a limited shelf life even at the normal freezer storage temperature of −20°C or thereabouts; they have a shorter life at higher temperatures up to 0°C, and are liable to rapid deterioration if allowed to thaw. It is desirable for all such products to carry, conveniently on the packet, an indicating device which would indicate the temperature/time history of the product so as to give a clearly visible warning if it has been kept for too long at any storage temperature, and more particularly to indicate whether the contents have been allowed to thaw and have then refrozen.

Several of such indicating devices have been proposed, some only giving an irreversible change if the temperature has exceeded 0°C at any time, others indicating, for example by a progressive color change, the combination of time and temperature which the device has experienced over a period of time. Such devices have tended to be excessively complex and expensive, generally relying upon sealed vials of materials which rupture upon freezing or thawing, possibly then undergoing chemical or electrolytic reaction.

We have found that a simple and inexpensive temperature indicating device may be made by utilising the temperature-dependent strain relaxation of an elastomeric material. If such a material is strained by an applied stress at a temperature at which the material has elastomerc properties, and then is cooled to a lower temperature and the stress released, the strain will reflux at a rate which is dependent upon the temperature, and may be used to indicate the thermal history of the device or of goods to which it is attached.

Conveniently, the temperature/time indicating device comprises an article of a natural or polymeric material and associated means for measuring or indicating the relaxation of strain induced in the article or alternatively the build up of stress in the article.

Preferably the polymeric article has a shape such that one linear dimension is at least an order of magnitude greater than one or both of the other two dimensions. Thus, the article may be a piece of thin sheet or film, or may be a thin rod or filament. More preferably, the article is a rectangular strip of polymeric film, which may be cut from film prepared by casting, extrusion or by any other suitable means.

Polymeric materials suitable for use according to the invention are materials which can exist in a rubber-like state at a temperature at which they are thermally stable. Strips of the materials in the rubber-like state can readily be strained to a considerable extension without breaking, and if released will rapidly recover to substantially their original dimensions. If the strips are first strained, cooled and then released, the relaxation will be slower, and if they are cooled below the lower limit of the temperature range over which the material exhibits rubber-like properties, the rate of relaxation will be very slow. Raising the temperature again will increase the rate of relaxation, and when the material is again in a rubber-like state, relaxation will become relatively rapid.

The transition between the rubber-like state and the non-rubbery state at lower temperatures may be a relatively sharp one or it may be gradual, depending upon the nature of the polymeric material. In the case of linear amorphous homopolymers there is a well-defined transition generally known as the glass/rubber transition, or Tg, below which the material is a brittle, rigid glass and above which the material has some degree of elastomeric properties. On the molecular scale, this transition is believed to mark the temperature at which the polymer chains become free to adopt different orientations.

Amorphous random copolymers, or polymers having some branching or cross-linking, may have poorly-defined Tg's and block copolymers may have more than one Tg corresponding to the Tg's of the separate homopolymer units.

In crystalline polymers, for example polyethylene, the Tg refers to the amorphous phase between crystalline regions.

This amorphous phase may represent the greater part of the material for a slightly crystalline polymer for example, polyvinyl chloride (PVC), or 20% or less for a high crystalline polymer, for example, polyethylene. Depending on the degree of crystallinity and other factors, for example, crosslinking, there may or may not be a well defined transition to a rubber state. A temperature indicating device according to the invention preferably comprises a polymeric material which is substantially amorphous, but the use of crystalline polymers is not excluded.

Preferably a substantially amorphous polymeric material suitable for use as a temperature/time indicating device for a perishable article will have a transition between rubbery and non-rubbery states in the region of the temperature above which the perishable article should not be stored.

Thus where the device is designed for use with, for example, a packet of frozen food, the storage temperature of which should not exceed, say −10°C, the polymeric material should have a Tg in the region of 0°C, for example 0°C ± 10°C. Warming the strained polymeric material above 0°C will then result in relatively rapid relaxation.

Materials suitable for use according to the present invention should have an extension to break at the temperature at which they are to be stretched of at least 50%, preferably at least 100%.

The polymeric material should not be heavily crosslinked, as such materials do not exhibit sufficient extensibility. The material may, however, be either a completely uncrosslinked linear polymer or a partially crosslinked polymer. The presence of some degree of crosslinking gives more rapid and complete recovery on relaxation and may be desirable if the material is to be held in the strained state for any length of time before cooling. In these circumstances, an uncrosslinked polymer may exhibit viscous flow, the result of which is that on relaxation the strip will not recover its original dimensions, but will remain partially extended. Viscous flow is greatly reduced by the presence of even a relatively small degree of crosslinking.

Materials suitable for use according to the invention include materials which are elastomeric at ambient temperature, that is, both natural and synthetic rubbers. The latter include butadiene/styrene rubbers, butyl rubbers, neoprene, nitrile rubbers, ethylene/propylene/termonomer rubbers and silicone rubbers, all of which may be partially vulcanised or crosslinked. Amorphous polymers of higher Tg which are only partially elastomeric at ambient temperature include homopolymers and copolymers of certain acrylates and methacrylates, for example poly(ethoxyethyl methacrylate). Such materials have Tg's in the region of 0°C, and if strained and released at ambient temperature, relax rapidly but not instantaneously. They are particularly suitable for use as indicating devices in connection with frozen food packages.

If a thin strip of a suitable material, for example poly(ethoxyethyl methacrylate), is strained to an extension of approximately 100%, cooled to −20° while strained, and attached by one end to a stiff backing material, the other end being free, the relaxation of the strip as a function of temperature and time will cause the free end of the strip to move towards the fixed end. Where the article to which the device is to be attached is a frozen food package in the form of a cardboard carton, the backing material may be the carton itself, but where the package is flexible, for example a polyethylene bag, it is desirable to provide a backing for the strip of a stiff material, for example cardboard. This backing could then be incorporated within the package or attached to it by adhesive, stapling, heat welding, etc.

Figure 2:
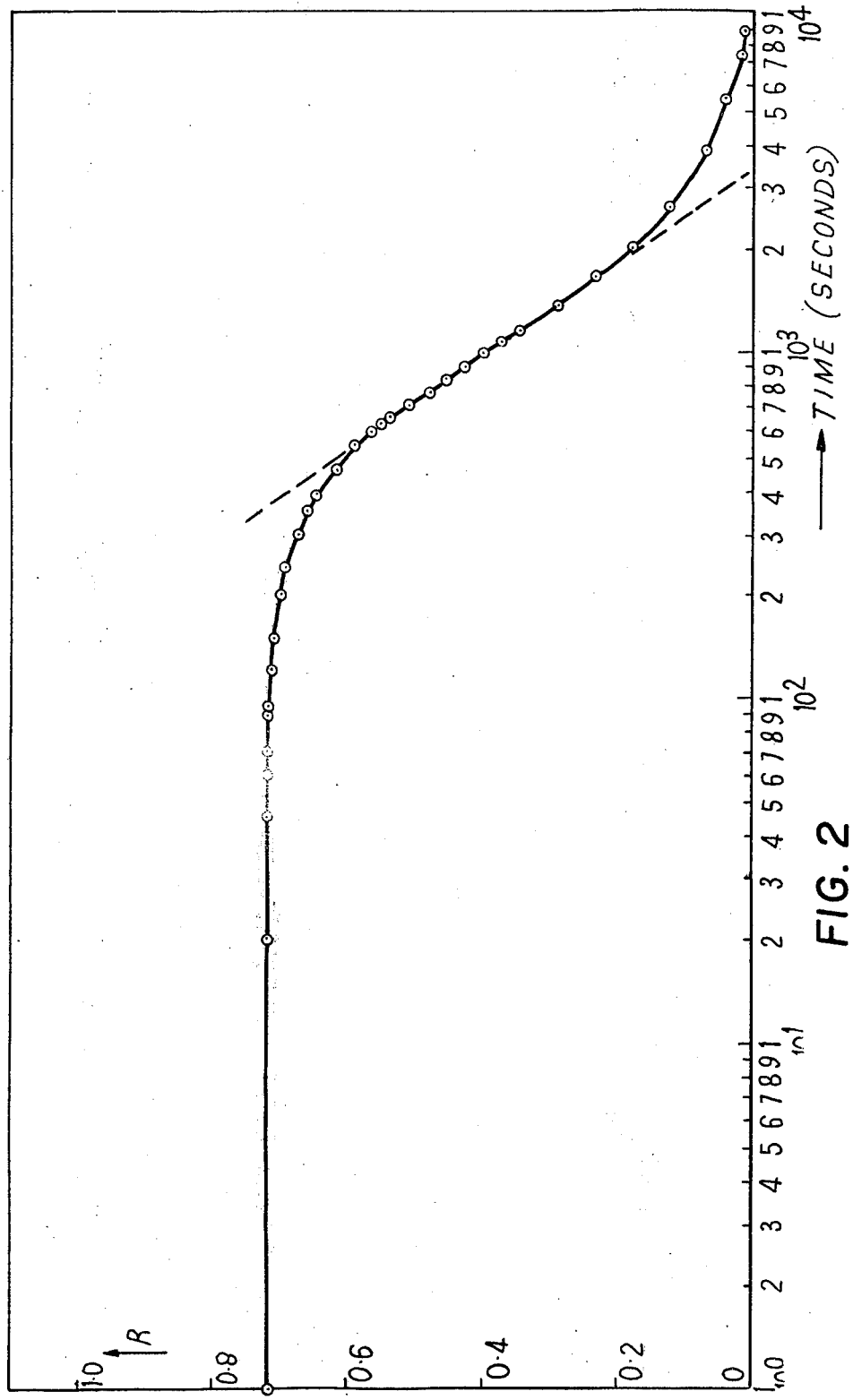
Figure 3:
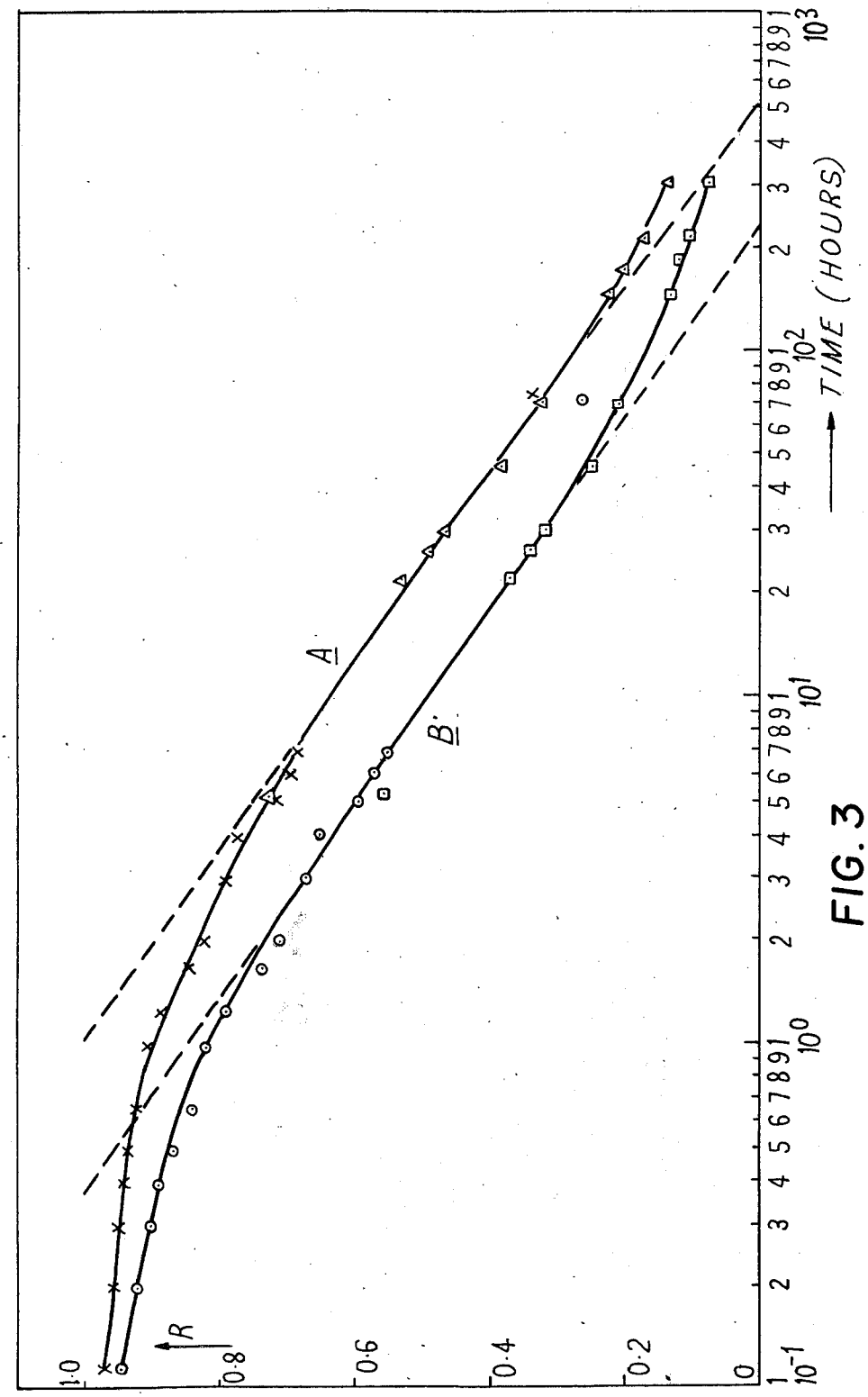

The invention will be further understood from the following more detailed descriptions of several exemplary embodiments taken with the drawings in which:

FIGS. 1, 2 and 3 are graphs of residual extension versus time for elastomeric strips;

FIGS. 4(a) and 4(b) are perspective views of a device, before and after a temperature increase respectively, in which a strained strip relaxes such that its free end moves along a linear scale on a backing strip;

FIG. 5 is a plan view of a device in which a relaxing strip acts upon a lever;

FIGS. 6(a) and 6(b) are plan views of a device, before and after a temperature increase respectively, in which a relaxing strip is a composite strip;

FIGS. 7(a) and 7(b) are elevational views of a device, before and after a temperature decrease respectively, in which a strip is initially attached to a backing strip at both ends and one end becomes detached upon cooling; and FIGS. 8(a) and 8(b) are elevational views of a device, before and after a temperature decrease respectively, in which a bimetallic disc operates to free one end of a strip upon cooling.

The associated means for measuring the relaxation of strain according to the invention may then be for example, a linear graduated scale inscribed on the backing material or on another article which is fixed relative to the fixed end of the strip. delay, scale may be graduated with a series of numerical values, or may bear a single mark defining the point which, if reached by the free end of the strip, indicates that the contents of the package should not be consumed. The associated measuring means may alternatively comprise a series of symbols which are progressively uncovered by the free end of the strip as the strip relaxes. For example the end of the strip may progressively uncover green, yellow and red dots, indicating respectively that the package may continue to be stored safely, that the contents should be consumed without dealy, and that the contents have passed the point at which they should no longer be consumed (for convenience in subsequent discussion this will be referred to as the "rotten point" of the package or its contents). If this embodiment of measuring means is employed it is desirable that the material of the strip is opaque, for example it may include a pigment in concentration sufficient to render the strip opaque. Alternative measuring means will be apparent to the skilled man; for example the strip may act upon a lever moving a pointer across a scale.

Alternatively the device may be a composite strip comprising two strips which will relax at different rates and which are caused to adhere to one another along their lengths. The two strips may be of different materials, or of the same material strained to different extents. Such a composite strip on relaxing will tend to curl up in the manner of a heated bimetallic strip, and associated measuring means may be used to measure the extent of deflection. For example the strip may be fixed at one end to a stiff backing material with its width perpendicular to the plane of the backing, and the motion of the edge of the strip across an arcuate scale may be observed, alternatively the free end of the strip may rotate a pointer when the strip curls up.

In an alternative embodiment of the invention, the polymeric strip is fastened at both ends to the stiff backing while it is in the strained and cooled state. Relaxation of the polymer will then cause stress to build up in the material, and if the material is fastened to the backing by a link which will break when a certain stress is reached this may be used as an indication of the rotten point. This embodiment is less likely to be reliable than embodiments utilising stress-free relaxation of strain, is liable to accidental damage and is not preferred.

For reasons of simplicity the preferred embodiment is a rectangular strip of polymeric material attached to one end to a stiff backing and whose free end uncovers or moves across a linear scale on relaxation.

For reasons of convenience, for example, where packages are filled with cooked or fresh food at room temperature and then the package and its contents are placed in a cold room for freezing and storage it is sometimes desirable to apply the indicating device to the package at room temperature, yet the strip must not be free to relax at room temperature before freezing. Thus the strip may be applied, with simultaneous or subsequent stretching, to a carton blank and fastened at both ends to a portion of the carton blank which will form one face of the carton. The strip may then be frozen (simultaneously with the contents of the package) and then released at one end only.

This release may be achieved by cutting the strip near to one end after freezing, but this is undesirable in that it necessitates handling of the packages subsequent to the freezing stage. In a preferred process, when the strip is applied to the carton blank, one end is fastened permanently, for example by heat-sealing or by an adhesive unaffected, by freezing, the strip is stretched, and the other end is attached by an adhesive which loses its adhesive properties at low temperatures. This adhesive may be applied as an adhesive layer between the strip and the carton blank, or as a backing on an adhesive tape placed across the end of the strip and adhering both to the strip and to the carton. The strip is then secured against relaxation at room temperature, and on freezing the adhesive bond securing one end breaks down and the strip is free to relax. When the strip is released there may be an immediate small contraction due to the purely elastic component of the visco-elastic behaviour of the strip, and this may serve to detach the free end from the adhesive and prevent re-adhesion at higher temperatures. Suitable adhesives whose adhesive properties are lost on freezing are water-based adhesives for example, tacky aqueous solutions of poly vinyl alcohol, polyethylene oxide and starch-dextrin. If the frozen food package is flexible, the strip may be attached to a stiff backing in the same way as described above for a carton blank, and the backing, together with the strip, may be incorporated in or attached to the flexible package.

Temporary anchorage of the "free" end of the strip may be effected by the use of plastics which are very brittle at low temperatures, e.g., polystyrene, which, if made into anchoring means such as, for example, rivets, may be broken mechanically when a suitably low temperature is attained. Thus some stress may be applied to the fastening, for example the stress generated by the effect of differential thermal contraction or by the action of a simple bimetallic attachment.

The phenomenon known as "blocking," that is the adhesion commonly observed between smooth sheets of certain polymeric materials, may also be employed to effect temporary anchorage of the elastomeric material.

The forces generated or movements obtained from bimetallic devices may be used to activate indicators in accordance with the invention. One specific device which may be used comprises a concave or convex bimetallic disc or strip which at a lower temperature inverts to respectively a convex or concave disc or strip. One side of the disc or strip carries a revet or pin which passes through an aperture in the backing of the indicator to engage an aperture in the elastomeric film when in the stretched condition. Lowering of the temperature causes reversal of curvature of the bimetallic disc or strip at the same time withdrawing the revet or pin to release one end of the elastomeric film. Devices based on differential thermal contraction may also be used as temporary fastening means. Below Tg, the elastomer in its stretched condition will lose its elastic properties and will be subject to normal thermal expansion and contraction. In one specific example, such a device includes a pin having at one end a spring or other resilient means which is deflected or compressed when the pin is inserted in an aperture in the backing of an indicator, the pin engaging an aperture in the stretched elastomer film and retaining it in position at temperatures above Tg. At lower temperatures differential contraction reduces the grip of the elastomer on the pin which is partially withdrawn from the aperture by the action of the spring or other resilient device and the elastomeric film is released at one end.

External activation of an indicator can be carried out provided that a temporary fastening for securing one end of the film is provided which can be suitably released by external means without affecting the condition of the elastomer. One example is the use of a small fastener made from a low melting point metal such as Woods metal, and after reducing the temperature of the indicator device to below Tg, passing the indicator through a radio frequency heater to melt the fastener and so release one end of the film without significantly raising the temperature of the indicator or of the package to which the indicator may be attached.

Temporary fastening means based on a mechanism utilizing the β (white tin) to α (grey tin) transformation for achieving release may be used. Normal β white tin transforms to a powdery allotropic form α grey tin at low temperatures. The transition temperature is quoted as about 13°C but the rate of transformation β α increases as the temperature drops towards about −25°C. High purity tin is required as many impurities suppress the transition. This allotropic change may be used in a number of activating systems typified by a. Sandwich construction. A layer of β tin is adhesively bonded to the substrate on one side and to the stretched elastomer on the other, thus indirectly bonding the stretched elastomer to the base. On reaching the low temperature the tin will transform to power (α tin) and break the bond with the substrate.

b. Staple or rivet construction. A β tin staple or rivet is used to fix the stretched elastomer to the substrate. On reaching low temperature the tin will fail and release the elastomer.

c. Weak link construction. A piece of tin foil is adhesively bonded to the end of the stretched elastomer and extends beyond the end of the elastomer. The overlapping piece of tin foil is adhesively bonded to the substrate. On reaching the low temperature the tin foil will fail and release the elastomer.

It is desirable that the fixed end of the strip is secured to the carton blank or stiff backing in the unstrained state, and subsequently strained and the free end temporarily secured. If the fixed end of the strip is secured in the strained state the tendency of the strip to relax in the region which is secured may cause the strip to curl or distort, or may cause the end of the strip to become detached, for example by breaking an adhesive bond.

Indicating devices according to the invention may also be used by persons who freeze produce at home. The devices may be supplied, for example, in the form of prestretched strips attached at both ends to stiff backings, e.g., of cardboard or plastics incorporating a linear scale, which could be attached to packets of, say, frozen food and one end then freed by cutting or by breaking of an adhesive bond, as described above. As such devices would be maintained in the strained state at room temperature for some time it would be desirable for the polymeric material to be crosslinked to some degree in order to minimize set due to viscous flow. Alternatively, such devices may be supplied in the unstretched state, the user would stretch the strip to an indicated extent before use, and optionally secure the free end with adhesive tape which would lose its adhesive properties on freezing.

Where the device is applied commercially to a packet of frozen food, it is desirable that the device is not exposed on the outside of the package, as a short exposure to room temperature might then cause the device to reach a temperature above 0°C while the contents of the packet remain safely frozen. Preferably, where the device is applied to a carton blank, it will be covered at least partially by outer wrappings having some insulating properties. More preferably the outer wrappings may incorporate a window of transparent material so that at least the free end of the strip may be observed through the outer wrappings.

The device may be adapted for use with frozen foods of differing perishability for example by the use of polymeric materials of differing Tg, by stretching a given material to a different extent, or by employing the polymeric material with a scale by means of which the rotten points of different products could be indicated. Where it is desired to use materials of differing Tg, it may be convenient to modify the Tg of a given plastics material by incorporating a greater or lesser amount of plasticiser. For example unplasticised PVC has a Tg of 80°C, but by incorporating varying amounts of plasticiser, the Tg may be lowered to −40°C or to any intermediate temperature. The correlation of polymer properties and degree of extension with the relaxation on warming in order to select a suitable indicator for a particular application will be a matter of routine experimentation presenting no difficulty to a skilled man.

While the principal intended use of indicating devices according to the present invention is in connection with frozen food packages, it will be apparent that suitable indicating devices according to the invention may be used to indicate the thermal history of other perishable goods, for example milk and other dairy products, fresh fruit and vegetables, parmaceuticals, photographic film, fine chemicals for example peroxide catalysts, and in general as a cheap and reliable temperature/time indicating device. It will present no problem to the man skilled in the art to select suitable materials for specific applications.

A preferred group of elastomeric polymers are polyurethane elastomers having a Tg within the range −10° to 35°C.

Generally it is convenient that the glass/rubber transition temperature of the elastomeric material is within 25°C of the storage temperature of the frozen article, preferably 5° to 15°.

It will be appreciated that "freezing" is used in this specification in the sense of maintaining an article at a low temperature, usually in the range −10° to −40°C for a period of time, not in the narrower sense of solidification produced by low temperature.

The elastomeric material employed may be converted to their final form by any suitable method, many of which are well known to those skilled in the art. For example, a solid product may be fabricated by injection moulding, extrusion, calandering, blow moulding, compression moulding, vacuum forming, electrostatic coating, dip coating of the powder form.

In FIG. 4(a) a strip of elastomer 2 in a cold stretched condition is attached at 3 to a backing card 1 which is inscribed with a linear graduated scale 4. FIG. 4(b) shows the device after warming, in which the elastomeric strip 2 has contracted exposing some of the graduations 4.

In FIG. 5 a stretched strip of elastomer 5 is attached at 6 to a backing material 7 inscribed with markings 8. To the free end of the strip 5, is attached a pointer 9, pivoted at 10, such that on contraction of the strip 5 the pointer 9 moves along the marks 8.

In FIG. 6(a) a composite strip 11, comprising two stretched elastomeric strips which relax at different rates and which adhere to one another along their lengths, is attached at 12 to a backing material 13 on which are inscribed marks 14, the width of the strip 11 being perpendicular to the plane of the backing material 13. On warming, the strip 11 bends as shown in FIG. 6(b) so that its free end moves along the marks 14 indicating the temperature/time conditions to which the strip 11 has been exposed.

FIG. 7(a) shows a strip of stretched elastomer 15 attached fixed at one end at 16 to a backing material 18 and temporarily attached at its other end to the backing material 18 by an adhesive 17. The adhesive is chosen so that on cooling it loses its adhesive properties such that one end of the strip is freed as in FIG. 7(b).

FIG. 8(a) shows a strip 19 of stretched elastomer 19 fixed at 20 to backing material 21. To the reverse side of backing material 21 is attached a bimetallic strip 22, to the free end of which is attached a pin 23 which protrudes through holes 24 in the backing material 20 and the strip 19. Lowering of temperature causes reversal of curvature of the bimetallic strip 22, at the same time withdrawing the pin 23 from the holes 24 to release one end of the elastomeric strip 19, as shown in FIG. 8(b).

The invention is further illustrated by the following examples.

In the examples, the parameter plotted as a function of temperature and time was the residual extension (R), defined as the ratio of the extension at time t to the initial extension. Thus if $x$ is the initial length of the unstrained strip, $x_o$ is the length of the strained strip at time $t = 0$ and $x_t$ is the length of the relaxing strip at time $t$, then $$R = \frac{(x_t - x)}{(x_o - x)}$$

Clearly, $R = 1$ at $t = 0$, and gradually decreases with relaxation until $R = 0$ for the fully relaxed strip.

EXAMPLE 1

A copolymer of 70% wt. ethyl acrylate and 30% wt. methyl methacrylate was prepared by aqueous emulsion polymerisation at 50% wt. solids, using potassium persulphate as catalyst. The product was diluted with water to 30% wt solids and a film was cast by spreading the emulsion on a glass plate and allowing the water to evaporate. The resulting film could be peeled from the glass plate, and was approx. 125μm thick. The polymer was amorphous, and had a Tg between 0° and 6°C.

A strip of film 50 mm long and 13 mm wide was clipped at one end to a base of rigid polymethyl methacrylate ("Perspex" R.T.M), strained to a length of approx. 90 mm (80% extension) and clipped to the base at the other end. The assembly was placed in a cold room at 0°C, and allowed to com to thermal equilibrium with its surroundings. After 1 hour, one end of the strip was released, and the length of the strip was measured at intervals by reference to a linear scale attached to the base. The residual extension (R) was calculated for each observation, and a graph plotted of R against log (time) (minutes) as shown in FIG. 1. The value of R declined from 1.0 to 0.72 in 2 days.

EXAMPLE 2

After two days at 0°C, the strip of Example 1 was removed from the cold room to an ambient temperature of 20°C, and the length of the strip was measured at more frequent intervals. FIG. 2 shows a graph of R against log (time) (seconds) at 20°C. It will be seen that the graph has a linear region between 600 seconds (10 minutes) and 1800 seconds (30 minutes) in which time the value of R drops from 0.56 to 0.20. It is desirable that the rotten point of the perishable goods with which the measuring device is associated should lie somewhere in this linear region in which, at a given temperature, the residual extension is changing most rapidly with log (time). For example, the strip illustrated in this example would be suitable for use with goods having a rotten point of 20 minutes at 20°C.

EXAMPLE 3

Homopolymers of 2-ethoxyethyl methacrylate were made by emulsion polymerisation and films were cast as described in Example 1. Film (A) was made from polymer prepared using sodium lauryl sulphate as emulsifier, film (B) from polymer prepared using turkey red oil (sulphonated castor oil) as emulsifier. The homopolymers had Tg's of approx. −5°C.

Strips were fixed to bases, strained, cooled in a cold room to approx. 0°C, and one end released as described in Example 1. The lengths of the strips were measured at intervals, both strips being measured simultaneously. The residual extension ($R$) was calculated for each observation.

A duplicate experiment was carried out, in which measurements were taken at more frequent intervals initially.

A composite graph of $R$ against log (time) (hours) is shown in FIG. 3, in which for strips of Film A, points observed in the first experiment are shown as triangles and in the duplicate experiment as crosses, and for strips of film B, the corresponding points are shown as squares and circles respectively.

Whereas in Example 1 the strip relaxed to $R = 0.72$ in 2 days at 0°C, it was found that the same degree of relaxation was shown by film A in 5.1 hours and film B in 2.4 hours, the more rapid relaxation of these strips being due at least in part to the lower Tg of the homopolymer. Strips of B relaxed more rapidly than those of A, but both curves show linear regions with essentially the same slope.

The sensitivity of the measuring device is seen from the region between 1 hour and 7 hours on FIG. 3, in which there appears to be some degree of scatter of the points above and below each time. It is seen, however, that the "scatter" of the points about line A exactly matches the "scatter" of the corresponding points about line B. It is believed that these are not random variations but represent the response of the strips to fluctuations of temperature of ± 2°C and period of 2 hours in the temperature of the cold room.

EXAMPLE 4

A strip was prepared and stretched on a "Perspex" base as described in Example, cooled to −20°C in a deep freeze cabinet, and one end was released. The strip relaxed only from $R = 1.0$ to $R = 0.99$ in 2 months at −20°C.

On removal from the freezer to an ambient temperature of 20°C, the strip relaxed to $R = 0.20$ in 45 minutes, and eventually relaxed completely with no permanent set.

EXAMPLE 5

A polyurethane elastomer was prepared having the composition polyethylene adipate/phthalate (40:60 molar ratio) 4,4'-diisocyanatodiphenyl methane/1,4-butane diol (1:3,3:2.3 molar ratio).

The elastomer in 35% w/w solution in dimethyl formamide was cast into a film to give a solid sheet 0.1 mm thick and 6 cm square. The sheet was cut into strips 1 cm wide and 6 cm long.

The strips were stretched on a rigid base marked with an appropriate scale frozen to −20°C and one end released. There was no visible relaxation of the strip over a period of one month. Upon warning to ambient temperature the strip shortened by 1 cm in 2 minutes. It was then refrozen to −20°C and maintained at this temperature for a further month during which time it showed no further contraction. Warming again to ambient temperature produced a further visible relaxation within 2 minutes.

What we claim is:

1. A device capable of indicating the time/temperature history of a frozen product, comprising a strained article of elastomeric material having a glass/rubber transition temperature above the storage temperature of the frozen article and having the property of relaxing over a temperature range below the glass/rubber transition temperature at a rate which is dependent on the temperature, and means for indicating the amount of relaxation of the article on change of temperature through the glass/rubber transition temperature, whereby said means indicates the time/temperature history of the frozen product.

2. A device according to claim 1 in which the glass/rubber transition temperature of the elastomeric material is within 25°C of the storage temperature.

3. A device according to claim 1 comprising means for temporarily maintaining the elastomeric material in a form imposed by application of stress thereto, said means becoming inactive at the storage temperature of the frozen article.

4. A device according to claim 3 in which the means for effecting temporary attachment of the elastomeric material comprises a temperature sensitive adhesive.

5. A device according to claim 1 comprising a strip of elastomeric material, one end region of the strip being bonded to a rigid component, the other end region of said strip being provided with means capable, after application of stress to the strip, of effecting temporary attachment to a suitable attachment point.

6. A device according to claim 1 in which the elastomeric material is a synthetic polymeric organic material.

7. A device capable of indicating the thermal history of a frozen product comprising: an elastomeric material having a glass/rubber transition temperature above the storage temperature of the frozen article; means for temporarily maintaining the elastomeric material in a form imposed by application of stress thereto, said means including a temperature sensitive material the adhesive property of which is such that the temporary attachment is broken at the storage temperature of the frozen article; and means for indicating change in the strain in the material on change of temperature through the glass/rubber transition temperature.

* * * * *